United States Patent

Ashizawa et al.

Patent Number: 6,013,006
Date of Patent: Jan. 11, 2000

[54] SPEED RATIO CONTROLLER FOR VARYING A TIME CONSTANT AS A FUNCTION OF UPSHIFT CHARACTERISTICS IN A CONTINUOUSLY VARIABLE TRANSMISSION

[75] Inventors: Hiroyuki Ashizawa; Kazutaka Adachi; Tatsuo Ochiai, all of Kanagawa, Japan

[73] Assignee: Nissan Motor Co., Ltd., Yokohama, Japan

[21] Appl. No.: 09/127,464

[22] Filed: Jul. 31, 1998

[30] Foreign Application Priority Data

Aug. 1, 1997 [JP] Japan ................................ 9-208072

[51] Int. Cl.$^7$ ................................................ F16H 61/00
[52] U.S. Cl. ................................... 477/46; 477/48
[58] Field of Search ............................ 477/46, 48, 51; 701/58

[56] References Cited

U.S. PATENT DOCUMENTS

| | | | |
|---|---|---|---|
| 4,947,970 | 8/1990 | Miller et al. | 192/0.076 |
| 5,672,137 | 9/1997 | Adachi et al. | 477/45 |
| 5,695,428 | 12/1997 | Yuasa et al. | 477/48 |
| 5,782,719 | 7/1998 | Adachi | 477/46 |
| 5,820,514 | 10/1998 | Adachi | 477/46 |
| 5,857,937 | 1/1999 | Ashizawa et al. | 477/46 |

FOREIGN PATENT DOCUMENTS

| | | |
|---|---|---|
| 8-296708 | 11/1996 | Japan . |
| 11-51170 | 2/1999 | Japan . |
| 2 321 938 | 12/1998 | United Kingdom . |

OTHER PUBLICATIONS

*Patent Abstracts of Japan*, (Adachi, Kazutaka, et al., JP 10–220570, Aug. 21, 1998).
*Patent Abstracts of Japan*, (Adachi, Kazutaka, JP 09–072408, Mar. 18, 1997).
Gabel, Robert A., et al., *Signals and Linear Systems* (2$^{nd}$ edition) 1980, pp. 376 and 386.

*Primary Examiner*—Khoi Q. Ta
*Attorney, Agent, or Firm*—Foley & Lardner

[57] ABSTRACT

A speed ratio controller for a continuously variable transmission of a vehicle is provided which sets a target speed ratio according to a vehicle speed and degree of accelerator pedal depression, sets a command speed ratio according to the target speed ratio and a predetermined dynamic characteristic, and controls the transmission so as to obtain the target speed ratio while a real speed ratio follows the command speed ratio. This speed ratio controller computes a deviation between the command speed ratio and target speed ratio, and determines whether an upshift characteristic is an auto upshift, foot release upshift or foot return upshift based on the speed ratio deviation, degree of accelerator pedal depression, and variation amount of the target input shaft rotation speed. The dynamic characteristic of the command speed ratio is set according to the determination result, and the response characteristics of the transmission are thereby modified.

10 Claims, 9 Drawing Sheets

AUTO UPSHIFT

FOOT RELEASE UPSHIFT

FOOT RETURN UPSHIFT

SPEED RATIO CONTROLLER FOR VARYING A TIME CONSTANT AS A FUNCTION OF UPSHIFT CHARACTERISTICS IN A CONTINUOUSLY VARIABLE TRANSMISSION

FIELD OF THE INVENTION

The present invention relates to a speed ratio controller for a continuously variable transmission of a vehicle.

BACKGROUND OF THE INVENTION

A speed ratio controller for a continuously variable transmission of a vehicle determines a target speed ratio from a vehicle speed, throttle opening or degree of accelerator depression, and upshifts or downshifts the transmission. Upshift characteristics include auto upshift, foot release upshift and foot return upshift.

Auto upshift is upshift performed when substantially constant depression is maintained after a drive depresses the accelerator pedal to accelerate the vehicle and vehicle speed is increased. Foot release upshift is upshift performed when the driver releases the accelerator pedal from any position while the vehicle is traveling. Foot return upshift is upshift performed when the driver decreases the degree of depression on the pedal so that the pedal returns to an intermediate position. Hence, even if the upshifts are the same, the running conditions under which they are performed are different.

The speed ratio controller disclosed by U.S. Pat. No 5,695,428, issued Dec. 9, 1997 determines whether an upshift is an auto upshift or foot release upshift based on the throttle opening TVO and the variation in the target speed ratio, and varies the response characteristics of the transmission according to the upshift characteristics.

SUMMARY OF THE INVENTION

However, this conventional speed ratio controller does not distinguish between foot return upshift and foot release upshift. Therefore, it is not possible to set a speed change response in the speed ratio which is suitable for both foot return upshift and foot release upshift running conditions.

Specifically, in foot return upshift when the throttle opening TVO does not become zero if the speed change response is high, the vehicle accelerates even if the accelerator pedal returns. However, if the speed change response is set low to match foot return upshift, the fall of engine rotation speed is delayed although the driver has released his foot from the accelerator pedal.

It is therefore an object of this invention to distinguish between auto upshift, foot release upshift and foot return upshift, and to perform upshift smoothly.

In order to achieve object, this invention provides a speed ratio controller for a continuously variable transmission of a vehicle comprising a sensor for detecting an input shaft rotation speed of the transmission, a sensor for detect an output shaft rotation speed of the transmission, a sensor for detecting a degree of accelerator pedal depression, and a microprocessor. The microprocessor programmed to detect a real speed ratio of the transmission from the input shaft rotation speed and the output shaft rotation speed, compute a target input shaft rotation speed of the transmission from the output shaft rotation speed and the degree of accelerator pedal depression, compute a command speed ratio based on the target speed ratio and a predetermined dynamic characteristic, and control the transmission to obtain the target speed ratio while the real speed ratio follows the command speed ratio. The microprocessor is further programmed to compute a deviation between the target speed ratio and the command speed ratio, compute a variation amount of the target input shaft rotation speed, determine whether an upshift characteristic is an auto upshift, foot release upshift or foot return upshift based on the speed ratio deviation, degree of accelerator pedal depression and variation amount of target input shaft rotation speed, and set the dynamic characteristic according to the determined upshift characteristic.

According to an aspect of this invention, the microprocessor is further programmed to determine whether the upshift characteristic is an auto upshift, foot release upshift or foot return upshift based on the speed ratio deviation, degree of accelerator pedal depression, variation amount of target input shaft rotation speed and speed change characteristic on the immediately preceding occasion.

According to another aspect of this invention, the microprocessor is further programmed to select a dynamic characteristic map according to the upshift characteristic, and set the dynamic characteristic based on the dynamic characteristic map.

According to yet another aspect of this invention, the microprocessor is further programmed to select a dynamic characteristic map according to the upshift characteristic, and set the dynamic characteristic bed on the dynamic characteristic map and the speed ratio deviation.

According to yet another aspect of this invention, the microprocessor is further programmed to set the dynamic characteristic so that a response speed of the real speed ratio relative to the target speed ratio is smaller for foot release upshift than for auto upshift, and is smaller for foot return upshift than for foot release upshift.

The details as well as other features and advantages of this invention are set forth in the remainder of the specification and are shown in the accompanying drawings.

DESCRIPTION OF THE PREFERRED EMBODIMENTS

Figure 1:
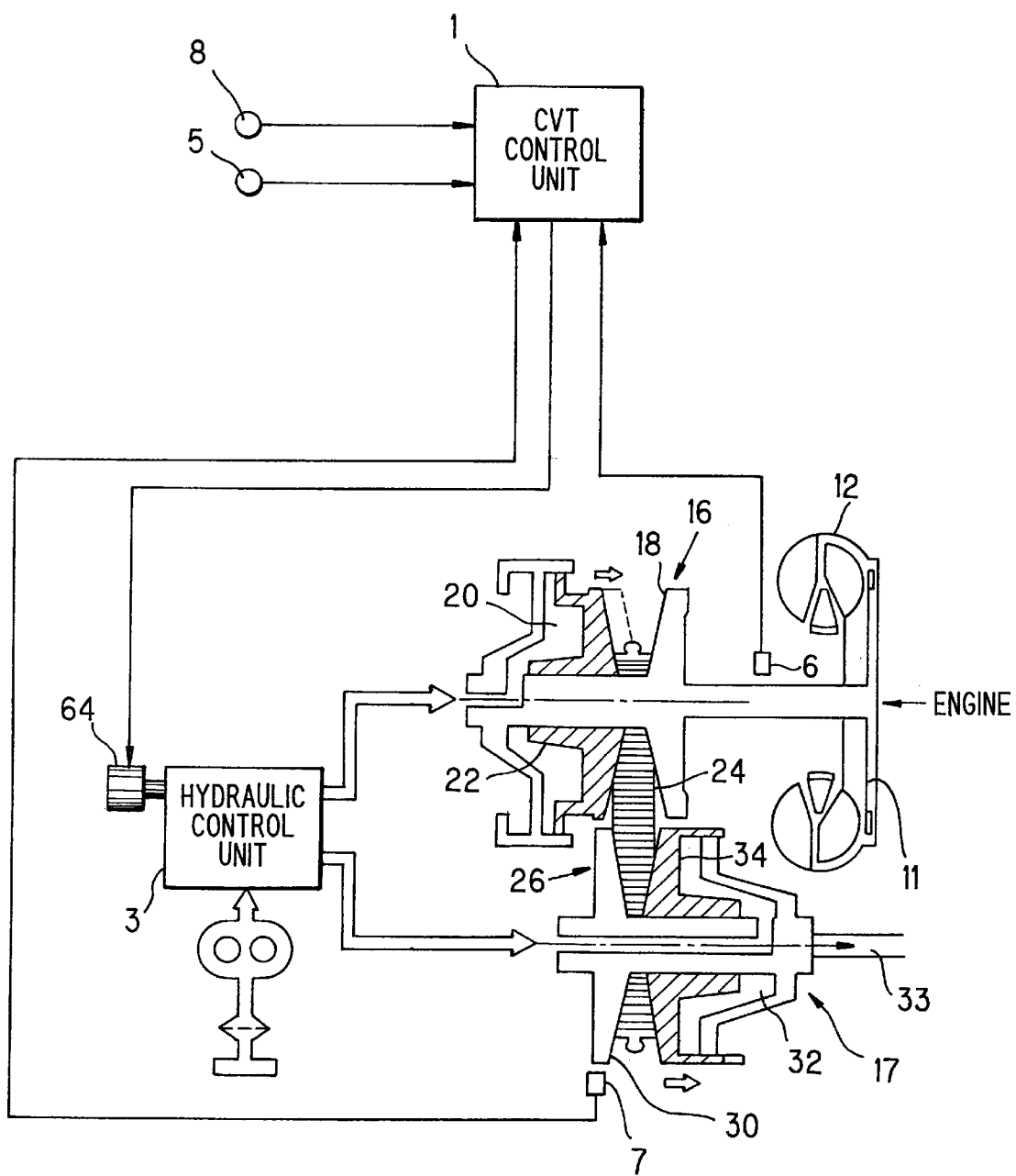
FIG. 1 is a schematic m of a continuously variable transmission according to this invention.

Referring to FIG. 1 of the drawings, a continuously variable transmission (CVT) 17 is connected to an engine, not shown, via a torque converter 12 comprising a lockup clutch 11. The CVT 17 is provided with a primary pulley 16 connected to the torque converter 12 and a secondary pulley 26 connected to an output shaft 33. A V-belt 24 is looped around these pulleys 16, 26.

The pulley 16 comprises a fixed conical plate 18 which rotates together with the torque converter 12 and a movable conical plate 22 arranged opposite the fixed conical plate 18, and a V-shaped grove is formed between these conical plates 18 and 22. The movable conical plate 22 is displaced in the direction of the pulley shaft by the oil pressure acting on a primary pulley cylinder chamber 20.

The secondary pulley 26 comprises a fixed conical plate 30 which rotates together with the output shaft 33, and a movable conical plate 34 arranged opposite the fixed conical plate 30, and a V-shaped pulley groove is formed between these conical plates 30 and 34. The movable conical plate 34 is displaced in the direction of the pulley shaft by oil pressure acting on a secondary pulley cylinder chamber 32. The movable conical plate 34 has a larger piston area than the movable conical plate 22.

A torque input from an engine, is transmitted to the primary pulley 16 of the CVT 17 via the torque converter 12, and it is transmitted from the primary pulley 16 to the secondary pulley 26 via the V-belt 24. When the movable conical plate 22 of the primary pulley 16 and the movable conical plate 34 of the secondary pulley 26 are respectively displaced in the axial direction, the contact radius between the V-belt 24 and each pulley varies, and the speed ratio ip between the primary pulley 16 and secondary pulley 26, can be continuously varied.

For example, if the width of the V-shaped pulley groove of the primary pulley 16 is reduced, the contact radius between the secondary pulley 26 and V-belt 24 becomes relatively small, and the speed ratio decreases. On the other hand, if the width of the V-shaped pulley groove of the primary pulley 16 is increased, the contact radius between the secondary pulley 26 and V-belt 24 becomes relative large. The speed ratio therefore increases. Herein, a small speed ratio corresponds to a high speed gear in the conventional transmission, and a large speed ratio corresponds to a low speed gear in the same.

Figure 2:
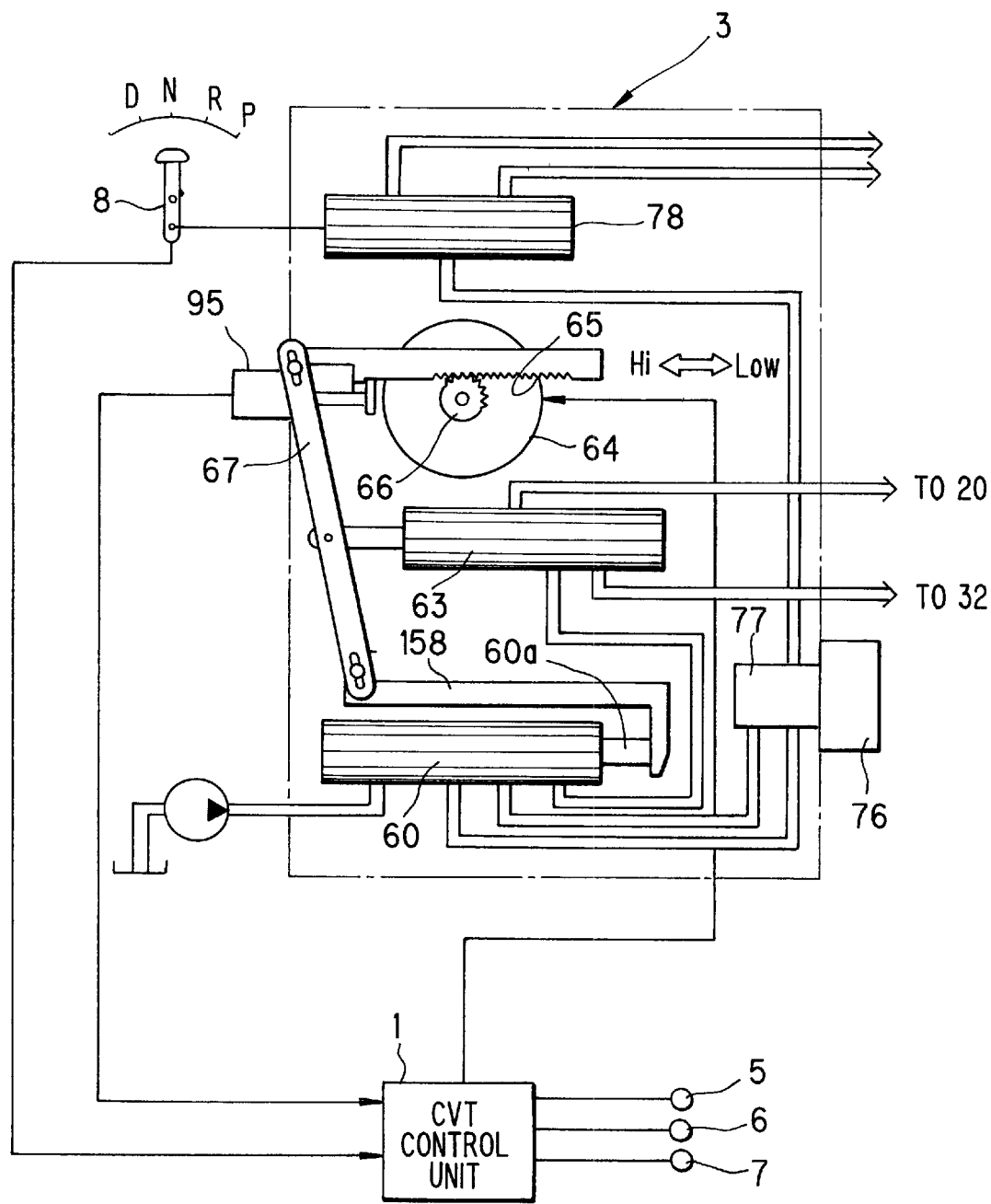
FIG. 2 is a schematic diagram of a hydraulic control unit according to this invention.

The speed ratio of the CVT 17 and the contact frictional force between the conical plates and the V-belt 24 are controlled by a hydraulic control unit 3, The hydraulic control unit 3 comprises a line pressure control mechanism, not shown, to adjust the line pressure, and a stepping motor 64 which drives a speed ratio control valve 63 according to a target speed ratio from a CVT control unit 1 as shown in FIG. 2.

A signal from an input shaft rotation sensor 6 which detects an input rotation speed Npri of the primary pulley 16, i.e. the input shaft rotation speed of the CVT 17, and a signal from an output shaft rotation sensor 7 which detects an output shaft rotation speed Nsec of the secondary pulley 26, i.e. the output shaft rotation speed of the CVT 17, are input to the CVT control unit 1.

Signals which indicate the running state of the vehicle such as a shift position signal from an inhibitor switch 8 which detects a position of a shift lever, and a throttle opening signal TVO from a throttle opening sensor 5 which detects a throttle opening according to an accelerator pedal depression amount of the driver, an engine rotation speed signal Ne from a crank angle sensor, not shown, and an idle signal from an idle switch, not shown, are also input.

Based on these signals, the CVT control unit 1 controls the speed ratio according to the vehicle running state and the accelerator pedal operation of the driver.

In this embodiment, a value obtained by multiplying the output shaft rotation speed Nsec by a predetermined constant is used as a vehicle speed VSP.

The control of speed ratio is performed by controlling the stepping motor 64 which drives the speed ratio control valve 63 of the hydraulic control unit 3 as shown in FIG. 2, and controlling the oil pressure supplied to the primary pulley cylinder chamber 20.

The stepping motor 64 drives the speed ratio control valve 63 according to a command from the CVT control unit 1 via a link 67. The oil pressure supplied to the cylinder chamber 20 of the primary pulley 16 is thereby adjusted, and a real speed ratio $ip_R$ is controlled so as to coincide with a command speed ratio $ip_r$.

The hydraulic control valve 3 is provided with a feedback mechanism to feed back the speed ratio. Specifically, the stepping motor 64 engages with a rack 65 via a pinion 66, and the rack 65 connects with one end of the link 67 which has a predetermined lever ratio. A spool, not shown, of the speed ratio control valve 63 is connected midway along the link 67, and a feedback member 158 which moves according to a displacement in the axial direction of the movable conical plate 22 is connected to the other end of the link 67. One end of the feedback member 158 engages with the outer circumference of the movable conical plate 22 in an axial direction. A rod 60a of a line pressure control valve 60 is connected to a predetermined position of the feedback member 158. Due to this, the speed ratio control valve 63 and line pressure control valve 60 are driven according to the displacement of the stepping motor 64 and the displacement of the movable conical plate 22 in response to the real speed ratio.

The speed ratio control valve 63 controls supply of oil pressure to the cylinder chamber 20 of the primary pulley 16 according to the rotation angle of the stepping motor 64. When the rack 65 is displaced to the left of the figure, the supply oil pressure to the cylinder chamber 20 of the primary pulley 16 increases, and the CVT 17 changes the speed ratio in the decrease direction. When the rack 65 is displaced to the right of the figure, the oil pressure of the cylinder chamber 20 is reduced, and the CVT 17 changes the speed ratio in the increase direction.

The hydraulic control unit 3 is firer provided with a manual valve 78 which operates in synchronism with the shift lever, negative pressure diaphragm 76, throttle valve 77 which operates in synchronism with the negative pressure diaphragm 76, and a stopper 95 which limits the position of the rack 65 to a minimum speed ratio position and a maximum speed ratio position as shown in FIG. 2.

Next, the speed ratio control performed by the CVT control unit 1 will be described referring to the block diagram of FIG. 3 and the flow chart of FIG. 4.

Figure 3:
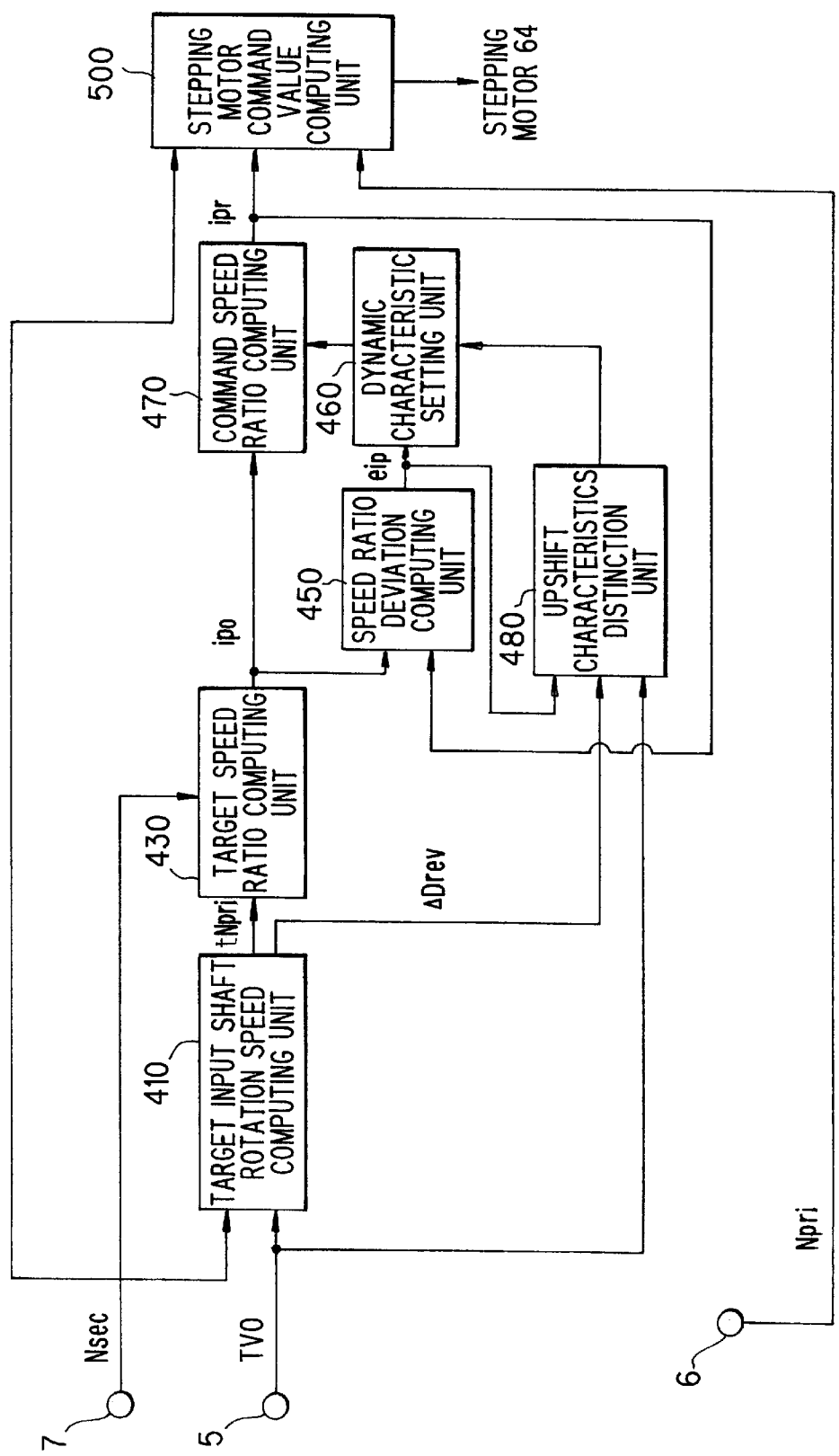
FIG. 3 is a block d of a CVT control unit according to this invention.
Figure 4:
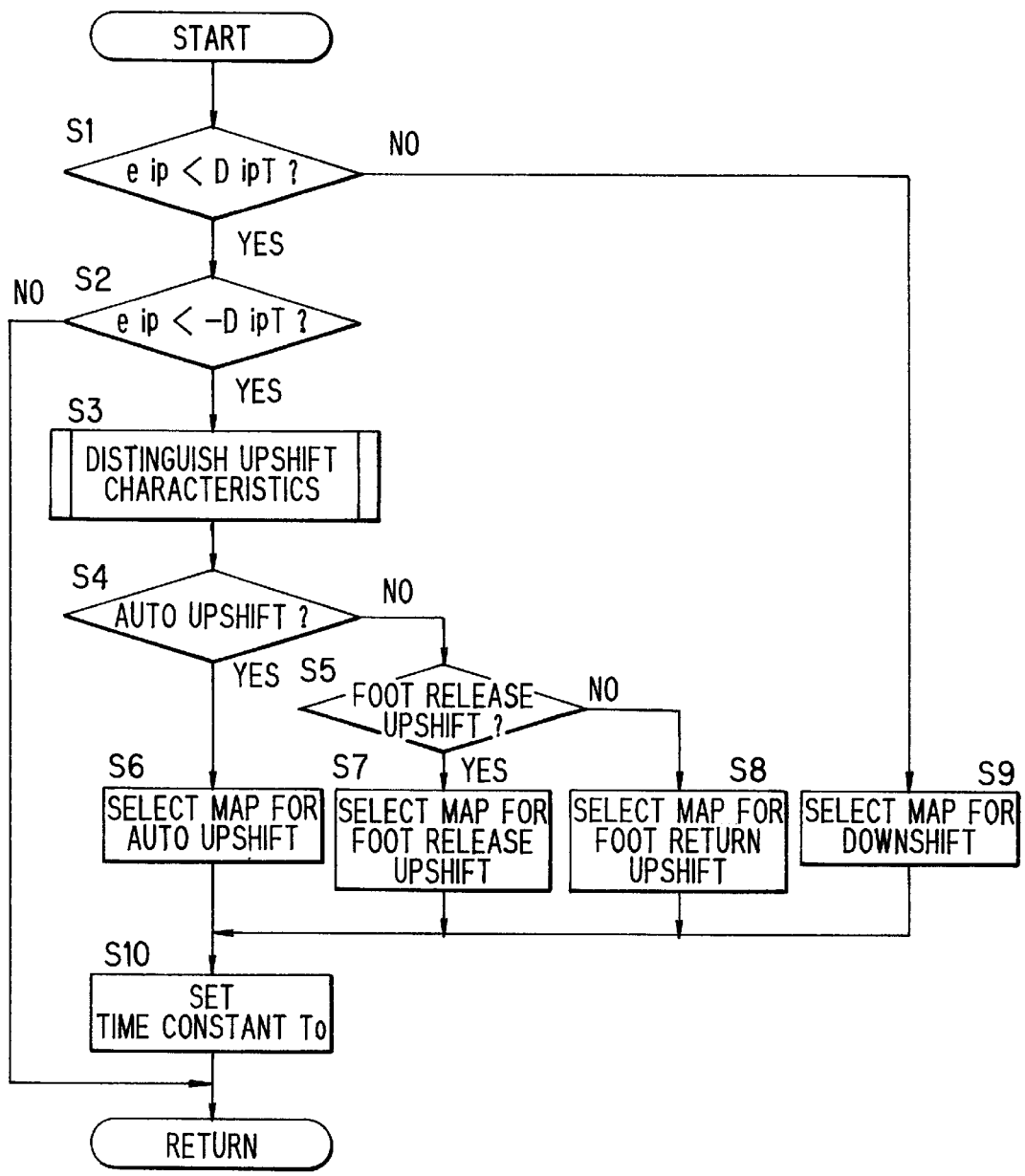
FIG. 4 is a flowchat describing a speed ratio control process performed by the CVT control unit.

The CVT control unit 1 comprises a microcomputer, and, as shown in the block diagram of FIG. 3, is provided with a target input shaft rotation speed computing unit 410, target speed ratio computing unit 430, speed ratio deviation computing unit 450, dynamic characteristic setting unit 460, command speed ratio computing unit 470, upshift characteristics distinction unit 480 and stepping motor command value computing unit 500.

The target input shaft rotation speed computing unit 410 computes a target input shaft rotation speed tNpri according to the vehicle speed VSP based on the output shaft rotation speed Nsec from the secondary pulley rotation sensor 7 and the throttle opening TVO from the throttle opening sensor 5. The target input shaft rotation speed computing unit 410 also computes a variation amount ΔDrev of the target input shaft rotation speed tNpri.

The target speed ratio computing unit 430 divides the target input shaft rotation speed tNpri by the detected output shaft rotation speed Nsec, and computes a target speed ratio $ip_0$.

The speed ratio deviation computing unit 450 computes a deviation eip between the target speed ratio $ip_0$ and command speed ratio $ip_r$.

The dynamic characteristic setting unit 460 sets a time constant $T_0$ for determining the dynamic characteristics of the command speed ratio $ip_r$. Specifically, a map according to upshift characteristics is selected, and the time constant $T_0$ is set based on this map and speed ratio deviation eip. The command speed ratio $ip_r$ is determined such that the real speed ratio $ip_R$ follows the target speed ratio $ip_r$ with the determined dynamic characteristics.

The command speed ratio computing unit 470 computes the command speed ratio $ip_r$ based on the target speed ratio $ip_0$ and dynamic characteristic time constant $T_0$.

The upshift characteristic distinction unit 480 determines the upshift characteristic when there is an upshift from the variation amount ΔDrev of the target input shaft rotation speed tNpri, speed ratio deviation eip and the throttle opening TVO.

The stepping motor command value computing unit 500 computes a command value output to the stepping motor 64 based on the command speed ratio $ip_r$ from the command speed ratio computing unit 470, the output shaft rotation speed Nsec and the input shaft rotation speed Npri.

The upshift characteristics are classified into auto upshift, foot release upshift and foot return upshift as shown in Table 1.

TABLE 1

| | Upshift characteristics |
|---|---|
| Auto upshift | Upshift performed when the driver maintains the throttle opening substantially constant when the vehicle accelerates |
| Foot release upshift | Upshift performed when the driver realeases the accelerator pedal from a previous degree of depression |
| Foot return upshift | Upshift performed when the driver reduces the degree of depression of the accelerator pedal, but does not completely release the pedal |

Next, the aforesaid speed ratio control process performed by the CVT control unit 1 will be described referring to the flow chart of FIG. 4.

First, in a step S1, a comparison is made as to whether the speed ratio deviation eip computed by the speed ratio deviation computing unit 450 is less than a preset threshold value DipT for determining a change direction of speed ratio. When the speed ratio deviation eip is determined to be equal to or larger than the threshold value DipT, it is determined that there is a downshift, and the routine proceeds to a step S9. If this is not the case, the routine proceeds to a step S2.

In the step S2, a comparison is made as to whether the deviation eip is less than a negative threshold value –DipT. When the deviation eip less than the negative threshold value –DipT, it is determined that there is an upshift and the routine proceeds to a step S3. If this is not the case, it is determined that a speed change has not taken place and the routine returns to the starting point.

Figure 5:
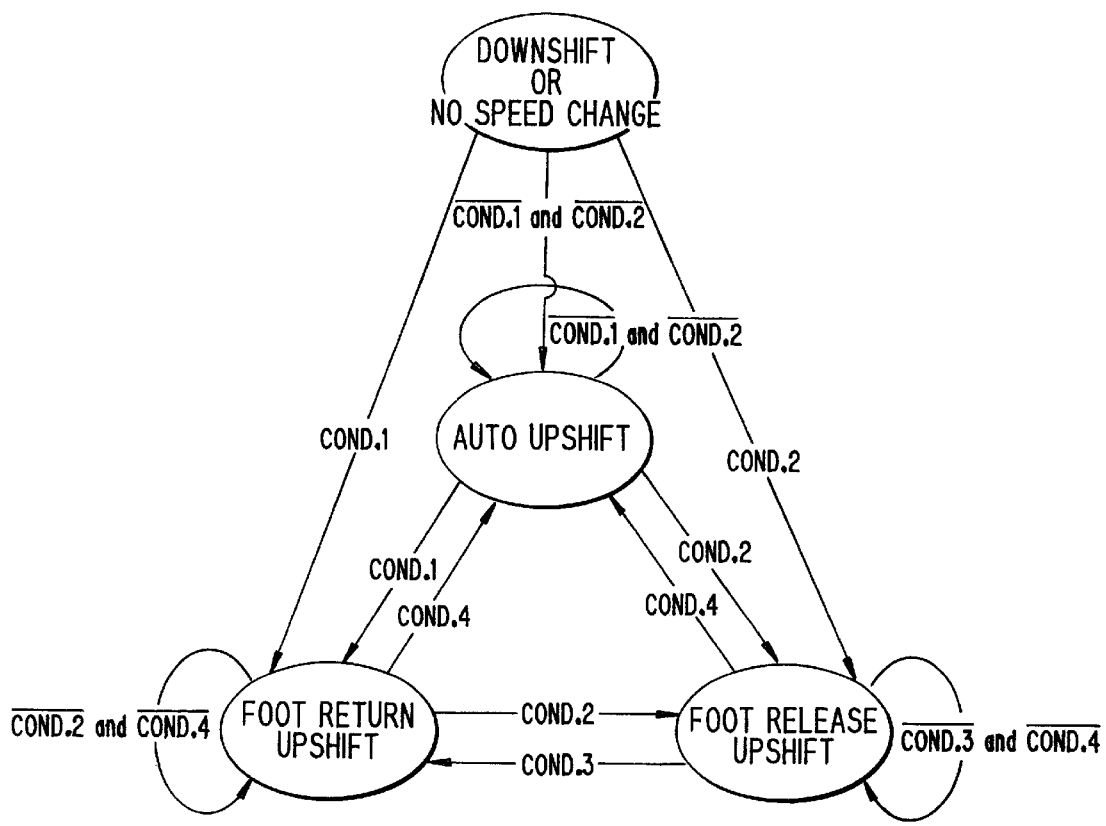
FIG. 5 is a figure describing an upshift distinction process performed by the CVT control unit.

In the step S3, a distinction is made between upshift characteristics shown in Table 1 according to the cases in FIG. 5, based on the throttle opening TVO, speed ratio deviation eip and variation amount ΔDrev of the target input shaft rotation speed tNpri, as well as the speed change characteristic on the immediately preceding occasion. The variation amount ΔDrev of the target input shaft rotation speed tNpri is computed form the difference between the present value and immediately preceding value of the target input shaft rotation speed tNpri.

In the determination process, the following are taken into consideration in order to distinguish the aforesaid characteristics.

(1) Case where speed change characteristic on the immediately preceding occasion is auto upshift.

When the throttle opening TVO≠0 and the variation amount ΔDrev<$K_D$ (Condition 1) holds, it is determined that the upshift is a foot return upshift. $K_D$ is a threshold value for determining foot return upshift, and it is preset to a smaller value than zero.

When the throttle opening TVO=0 (Condition 2) holds, it is determined that the upshift is a foot release upshift. When neither condition 1 nor condition 2 holds, it is determined that the upshift is an auto upshift.

(2) Case where speed change characteristic on the immediately preceding occasion is foot release upshift.

When the throttle opening TVO≠0 (Condition 3) holds, it is determined that the upshift is a foot return upshift. When deviation eip>Ke or VSP=0(Condition 4) holds, it is determined that the upshift is an auto upshift. Ke is a threshold value for determining auto upshift. When neither condition 3 nor condition 4 holds, it is determined that the upshift is a foot release upshift.

(3) Case where speed change characteristic on the immediately preceding occasion is foot return upshift.

When the throttle opening TVO=0 (Condition 2) holds, it is determined that the upshift is a foot release upshift. When deviation eip>Ke or VSP=0(Condition 4) holds, it is determined that the upshift is an auto upshift. When neither condition 2 nor condition 4 holds, it is determined that the upshift is a foot return upshift.

(4) Case where speed change characteristic on the immediately preceding occasion is a downshift, or where there is no speed change.

When the throttle opening TVO=0 (Condition 2) holds, it is determined that the upshift is a foot release upshift. When the throttle opening TVO≠0 and the variation amount ΔDrev<$K_D$ (Condition 1), it is determined that the upshift is a foot return upshift. When neither condition 1 nor condition 2 holds, it is determined that the upshift is an auto upshift.

Therefore, when it is determined in the step S2 that the speed change characteristic is an upshift, it is determined in the above cases (1)–(4) and based on conditions 1–4, whether the upshift characteristic is an auto upshift, foot release upshift or foot return upshift.

Figure 6A:
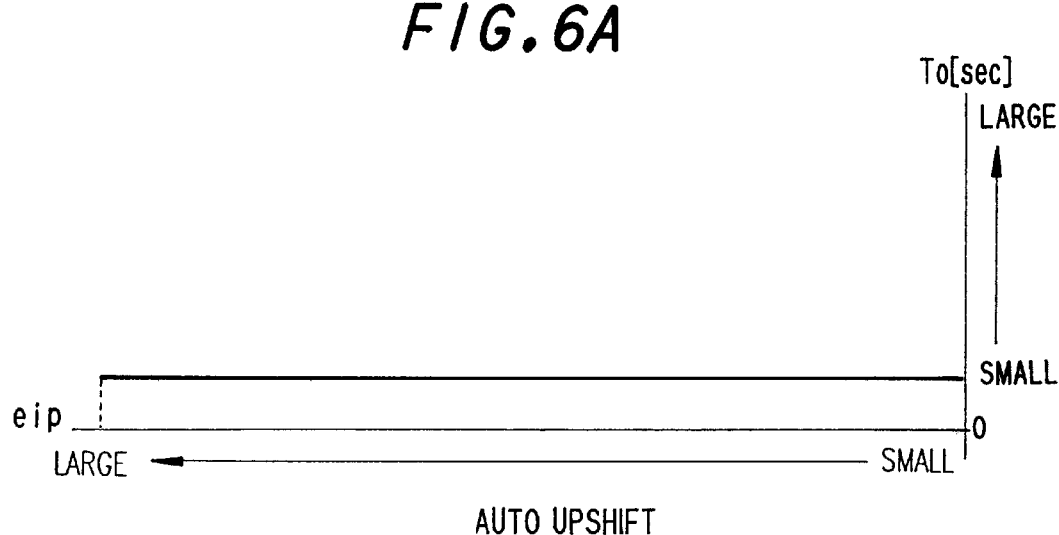
FIGS. 6A–6C are maps specifying a relation between a speed ratio deviation eip and dynamic characteristic time constant $T_0$ in auto upshift, foot release upshift and foot return upshift respectively.
Figure 6B:
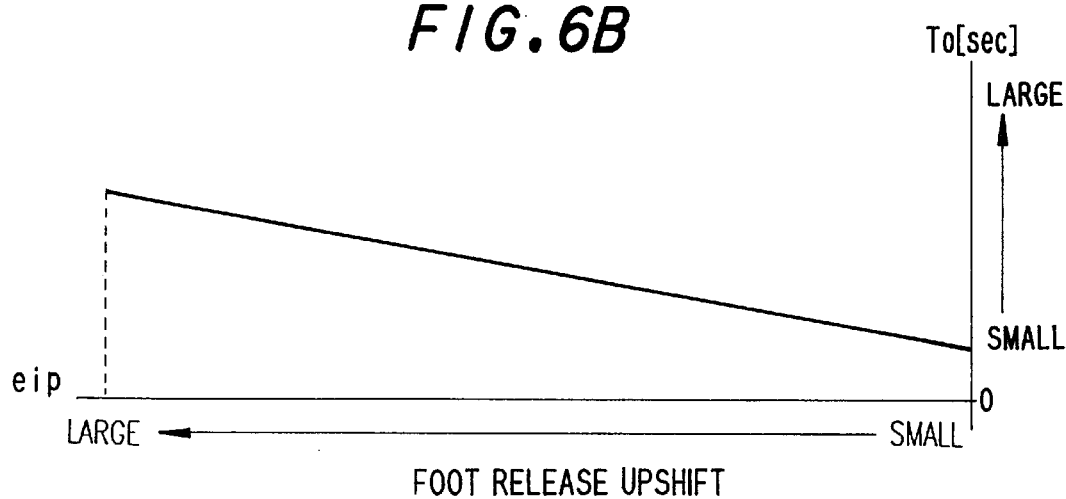
Figure 6C:
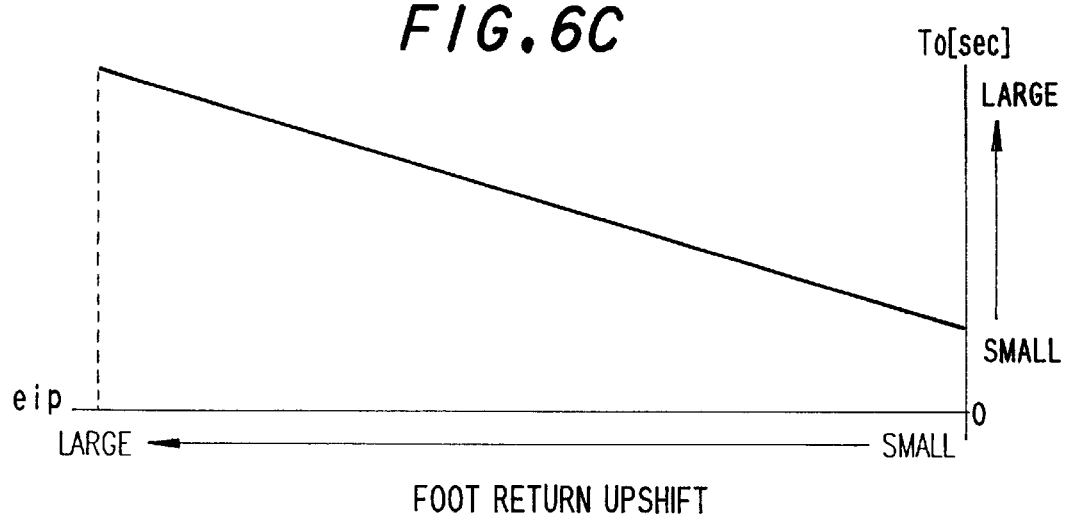

In steps S4 to S8, a map of the dynamic characteristic time constant $T_0$ shown in FIG. 6A–6C is selected according to the determined upshift characteristic. In a step S10, the dynamic characteristic time constant $T_0$ is set based on the selected map and speed ratio deviation eip.

In case of auto upshift, the dynamic characteristic time constant $T_0$ is set to a small fixed value regardless of the magnitude of the speed ratio deviation eip as shown in FIG. 6A. As a result, the delay of the command speed ratio $ip_r$ and real speed ratio $ip_R$ relative to the target speed ratio $ip_0$ becomes small.

In case of foot release upshift, the dynamic characteristic time constant $T_0$ is set to a larger value than in the auto upshift and is set to decrease as the speed ratio deviation eip decreases, as shown in FIG. 6B. Due to this, the command speed ratio $ip_r$ and real speed ratio $ip_R$ follow the target speed ratio $ip_0$ at a gradual, fixed rate.

In case of foot return upshift, the dynamic characteristic time constant $T_0$ is set to a lager value than in auto upshift and foot release upshift and is set to decrease as the speed ratio deviation eip decreases, as shown in FIG. 6C. Due to this, the command speed ratio $ip_r$ and real speed ratio $ip_R$ follow the target speed ratio $ip_0$ even more gradually than in the case of foot release upshift.

Figure 7:
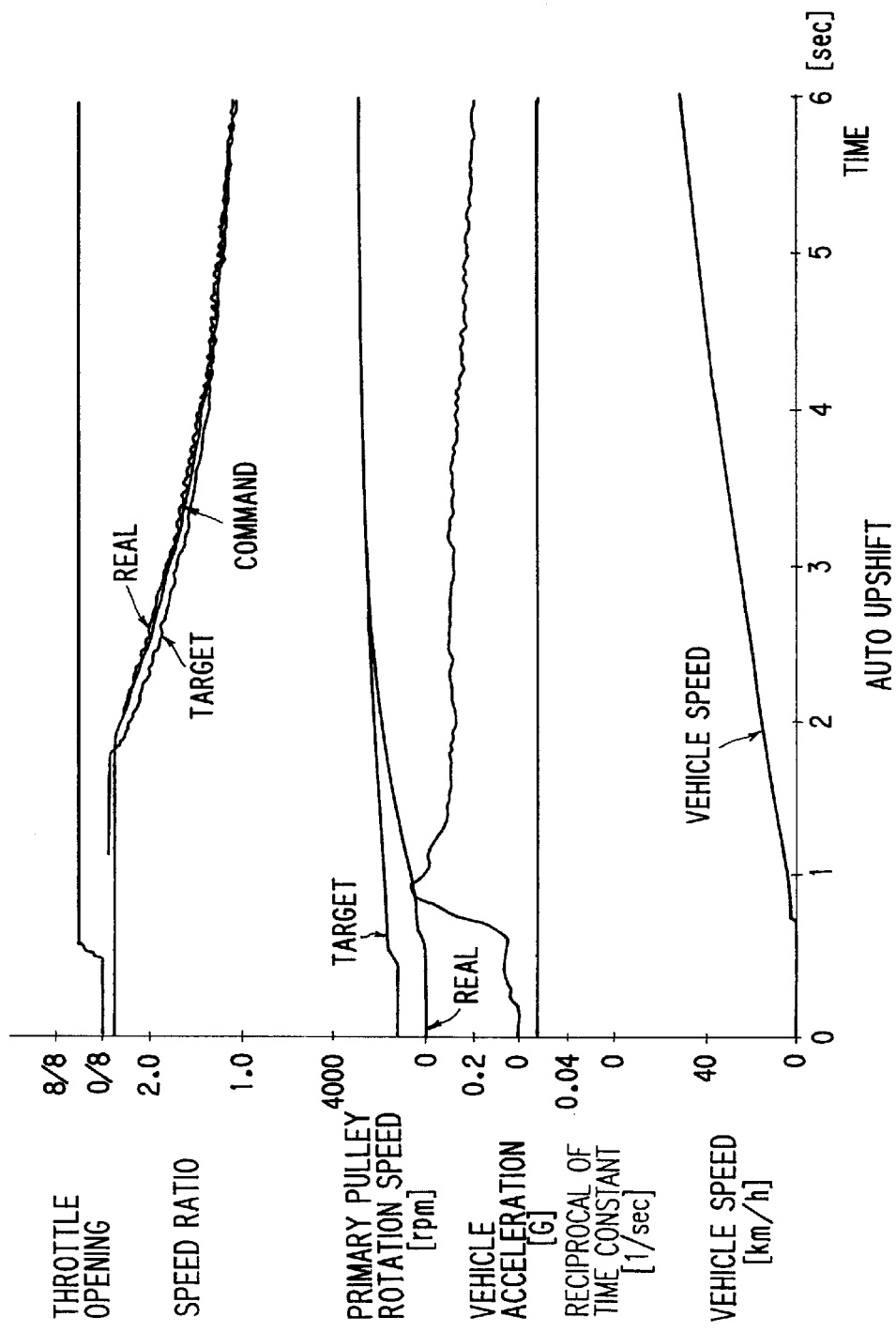
FIG. 7 is a timing chart showing how speed ratio changes during auto upshift.
Figure 8:
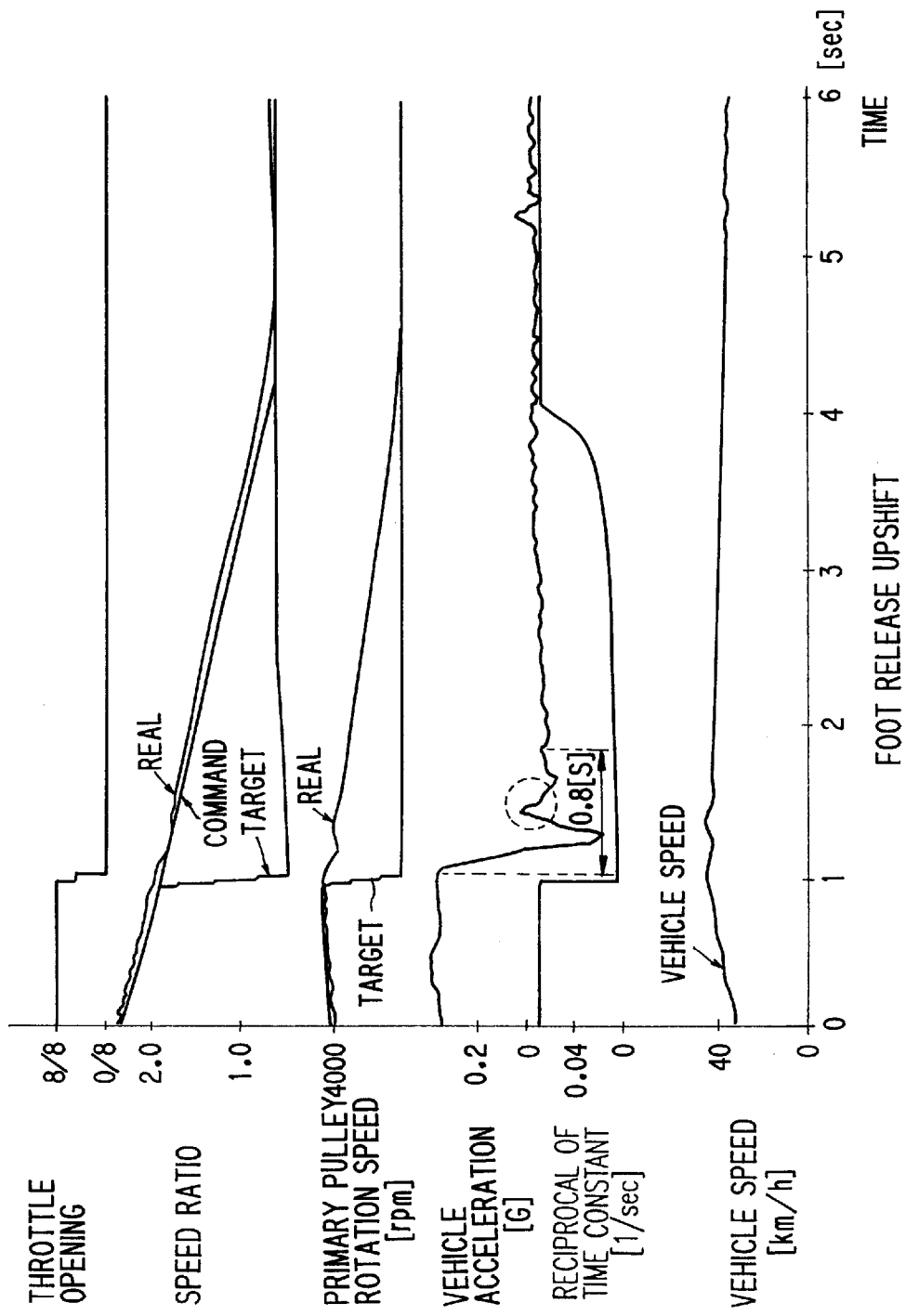
FIG. 8 is a timing chart showing how speed ratio changes during foot release upshift.
Figure 9:
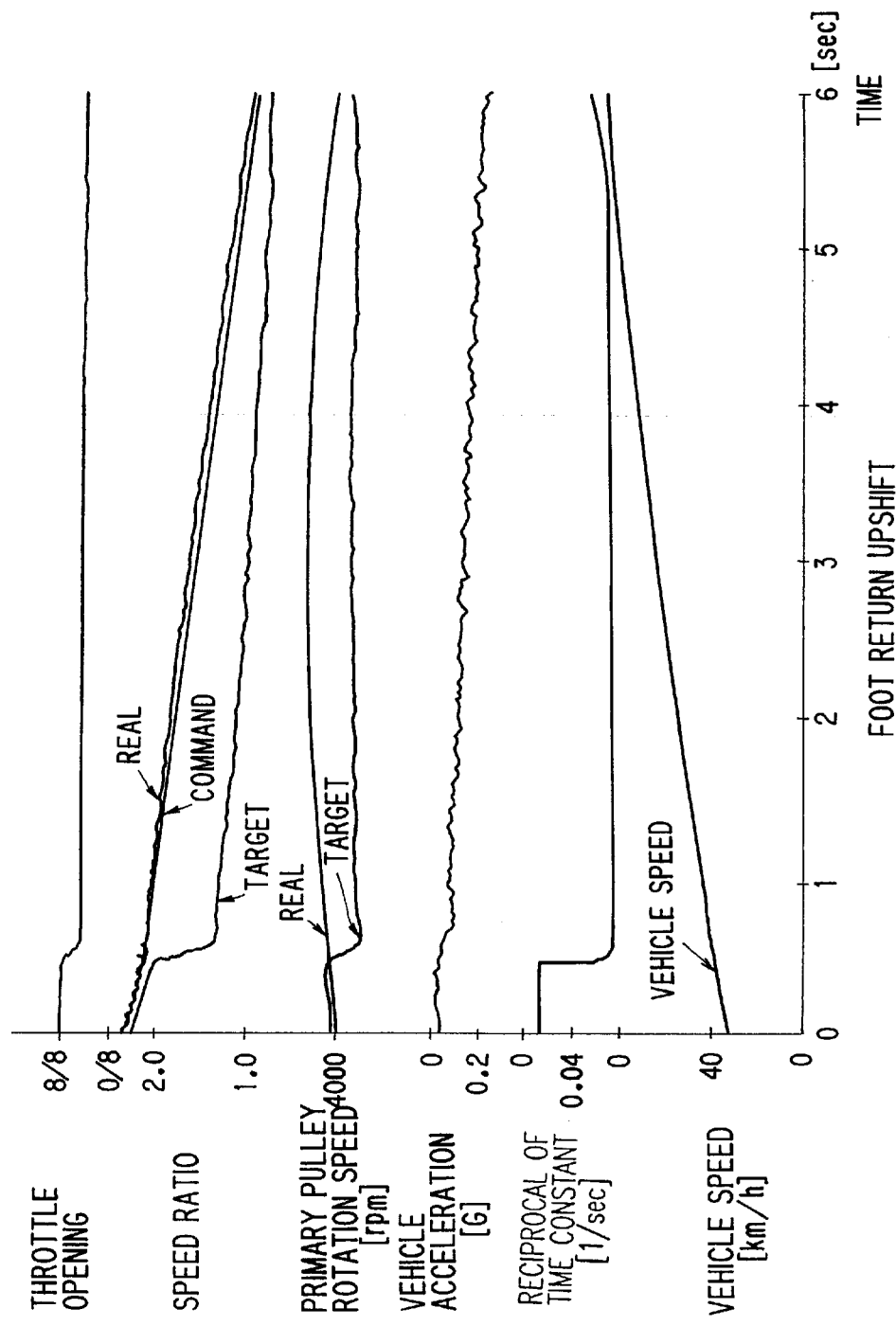
FIG. 9 is a timing chart showing how speed ratio changes during foot return upshift.

By making the dynamic characteristic time constant $T_0$ vary according to the characteristics of the upshift, upshifts can be performed smoothly as shown in FIG. 7–FIG. 9.

FIG. 7 shows the case of auto upshift where the throttle opening TVO is set to a fixed value, for example, 4/8. In this auto upshift, the dynamic characteristic time constant $T_0$ is set to a small fixed value regardless of the magnitude of the speed ratio deviation eip as shown in FIG. 6A, so the delay of the command speed ratio $ip_r$ and real speed ratio $ip_R$ relative to the slowly varying target speed ratio $ip_r$ becomes small. Also, overshoot of the input shaft rotation speed Npri is prevented, and fuel consumption is reduced.

FIG. 8 shows the case of foot release upshift where the throttle opening TVO is varied from 8/8 to 0/8 at a vehicle speed VSP=40 km/h. In this foot release upshift, the dynamic characteristic time constant $T_0$ is set to a larger value than in the auto upshift and is set to decrease as the speed ratio deviation eip decreases, as shown in FIG. 6B. Due to this, the command speed ratio $ip_r$ and reel speed ratio $ip_R$ follow the target speed ratio $ip_0$ which varies discontinuously, slowly at a fixed rate. Therefore the time for which the acceleration varies is shorter, and the shock experienced by the driver during speed change is suppressed.

FIG. 9 shows the case of foot return upshift where the throttle opening TVO is varied from 8/8 to 4/8 at a vehicle speed VSP=40 km/h. In his foot return upshift, the dynamic characteristic time constant $T_0$ is set to a larger value than in the auto upshift and downshift and is set to decrease as the speed ratio deviation eip decreases, as shown in FIG. 6C. Due to this, the command speed ratio $ip_r$ and real speed ratio $ip_R$ follow the target speed ratio $ip_0$ which varies discontinuously, more slowly than in foot release upshift. Acceleration of the vehicle is therefore prevented even if the accelerator pedal returns.

The contents of Japanese Application No. 9-208072, with ailing date Aug. 1, 1997, are hereby incorporated by reference.

In the aforesaid embodiment, the CVT 17 is a belt type continuously variable transmission, but a sit effect is obtained when the CVT 17 is a toroidal type continuously variable transmission.

The embodiments of this invention in which an exclusive property or privilege is claimed are defined as follows:

We claim:

1. A speed ratio controller for a continuously variable transmission of a vehicle comprising:

a sensor for detecting an output shaft rotation speed of said transmission, a sensor for detecting a degree of accelerator pedal depression, and a microprocessor programmed to:

compute a target input shaft rotation speed of said transmission from said output shaft rotation speed and said degree of accelerator pedal depression, compute a target speed ratio from said target input shaft rotation speed and said output shaft rotation speed, and compute a command speed ratio based on said target speed ratio and a predetermined dynamic characteristic, wherein said microprocessor is further programmed to:

compute a deviation between said target speed ratio and said command speed ratio, compute a variation amount of said target input shaft rotation speed, determine whether an upshift characteristic is any of an auto upshift, foot release upshift, and foot return upshift based on said speed ratio deviation, degree of accelerator pedal depression, and variation amount of target input shaft rotation speed, and set said dynamic characteristic according to said determined upshift characteristic.

2. A speed ratio controller as defined in claim 1, wherein said microprocessor is further programmed to:

determine whether said upshift characteristic is any of an auto upshift, foot release upshift, and foot return upshift based on said speed ratio deviation, degree of accelerator pedal depression, variation amount of target input shaft rotation speed, and speed change characteristic on an immediately proceeding occasion.

3. A speed ratio controller as defined in claim 1, wherein said microprocessor is further programed to:

select a dynamic characteristic map according to said upshift characteristic, and set said dynamic characteristic based on said dynamic characteristic map.

4. A speed ratio controller as defined in claim 1, wherein said microprocessor is further programmed to:

select a dynamic characteristic map according to said upshift characteristic, and set said dynamic characteristic based on said dynamic characteristic map and said speed ratio deviation.

5. A speed ratio controller as defined in claim 1, wherein said microprocessor is further programmed to:

set said dynamic characteristic so that a response speed of a real speed ratio relative to said target speed ratio is smaller for foot release upshift than for auto upshift, and is smaller for foot return upshift than for foot release upshift.

6. A speed ratio controller as defined in claim 1, wherein said microprocessor is further programmed to:

set said dynamic characteristic so that a response speed of a real speed ratio relative to said target speed ratio is greater for foot release upshift than for foot return upshift.

7. A method of operating a speed ratio controller for a continuously variable transmission of a vehicle, the method comprising:

detecting an output shaft rotation speed of said transmission;

detecting a degree of accelerator pedal depression;

computing a target input shaft rotation speed of said transmission from said output shaft rotation speed and said degree of accelerator pedal depression;

computing a target speed ratio from said target input shaft rotation speed and said output shaft rotation speed;

computing a command speed ratio based on said target speed ratio and a predetermined dynamic characteristic;

computing a deviation between said target speed ratio and said command speed ratio;

computing a variation amount of said target input shaft rotation speed;

determining whether an upshift characteristic is any of an auto upshift, foot release upshift, and foot return upshift based on said speed ratio deviation, degree of accelerator pedal depression, and variation amount of target input shaft rotation speed; and setting said dynamic characteristic according to said determined upshift characteristic.

8. A method of operating a speed ratio as defined in claim 7, further comprising:

determining whether said upshift characteristic is any of an auto upshift, foot release upshift, and foot return upshift, based on said speed ratio deviation, degree of accelerator pedal depression, variation amount of target input shaft rotation speed, and speed change characteristic on an immediately proceeding occasion.

9. A method of operating a speed ratio as defined in claim 7, further comprising:

selecting a dynamic characteristic map according to said upshift characteristic; and setting said dynamic characteristic based on said dynamic characteristic map and said speed ratio deviation.

10. A method of operating a speed ratio as defined in claim 7, further comprising:

setting said dynamic characteristic so that a response speed of a real speed ratio relative to said target speed ratio is smaller for foot release upshift than for auto upshift, and is smaller for foot return upshift than for foot release upshift.

* * * * *